United States Patent
Takano et al.

(10) Patent No.: US 8,734,991 B2
(45) Date of Patent: May 27, 2014

(54) NEGATIVE ELECTRODE MATERIAL FOR NONAQUEOUS ELECTROLYTE SECONDARY BATTERY

(75) Inventors: Yasuo Takano, Moriguchi (JP); Atsushi Fukui, Moriguchi (JP); Taizo Sunano, Moriguchi (JP); Maruo Kamino, Moriguchi (JP); Tetsuo Nakanishi, Annaka (JP); Koichiro Watanabe, Annaka (JP)

(73) Assignees: Sanyo Electric Co., Ltd., Osaka (JP); Shin-Etsu Chemical Co., Ltd., Tokyo (JP)

( * ) Notice: Subject to any disclaimer, the term of this patent is extended or adjusted under 35 U.S.C. 154(b) by 764 days.

(21) Appl. No.: 12/742,397

(22) PCT Filed: Nov. 7, 2008

(86) PCT No.: PCT/JP2008/070272
§ 371 (c)(1),
(2), (4) Date: May 11, 2010

(87) PCT Pub. No.: WO2009/063801
PCT Pub. Date: May 22, 2009

(65) Prior Publication Data
US 2010/0266902 A1    Oct. 21, 2010

(30) Foreign Application Priority Data
Nov. 12, 2007 (JP) .................. 2007-293486

(51) Int. Cl.
H01M 4/13    (2010.01)
C01B 33/02    (2006.01)
H01M 4/88    (2006.01)

(52) U.S. Cl.
USPC ................... 429/218.1; 429/231.95; 423/348; 252/182.1

(58) Field of Classification Search
None
See application file for complete search history.

(56) References Cited

U.S. PATENT DOCUMENTS

| | | | |
|---|---|---|---|
| 5,395,711 A | 3/1995 | Tahara et al. | |
| 5,401,599 A | 3/1995 | Tahara et al. | |
| 5,478,671 A | 12/1995 | Idota | |
| 5,556,721 A | 9/1996 | Sasaki et al. | |
| 6,066,414 A | 5/2000 | Imoto et al. | |
| 6,383,686 B1 | 5/2002 | Umeno et al. | |
| 6,413,672 B1 | 7/2002 | Suzuki et al. | |
| 6,638,662 B2 | 10/2003 | Kaneda et al. | |
| 2006/0275662 A1 | 12/2006 | Hirose et al. | |
| 2007/0099081 A1 | 5/2007 | Matsuda et al. | |

FOREIGN PATENT DOCUMENTS

| | | |
|---|---|---|
| JP | 3-8228 A | 1/1991 |
| JP | 3-79343 A | 4/1991 |
| JP | 3-242751 A | 10/1991 |
| JP | 3-291260 A | 12/1991 |
| JP | 2964732 B2 | 10/1999 |
| JP | 2997741 B2 | 1/2000 |
| JP | 2000-173596 A | 6/2000 |
| JP | 2000-215887 A | 8/2000 |
| JP | 2000-243395 A | 9/2000 |
| JP | 2000-243396 A | 9/2000 |
| JP | 2002-42806 A | 2/2002 |
| JP | 2002-75351 A | 3/2002 |
| JP | 2003-109590 A | 4/2003 |
| JP | 2004-185991 A | 7/2004 |
| JP | 2004-288564 A | 10/2004 |
| JP | 2004-296161 A | 10/2004 |
| JP | 2004-303593 A | 10/2004 |
| JP | 3622629 B2 | 2/2005 |
| JP | 3622631 B2 | 2/2005 |
| JP | 2005-190902 A | 7/2005 |
| JP | 2005-235589 A | 9/2005 |
| JP | 2005-317309 A | 11/2005 |
| JP | 2006-216374 A | 8/2006 |
| JP | 2006-236684 A | 9/2006 |
| JP | 3846661 B2 | 11/2006 |
| JP | 2006-338996 A | 12/2006 |
| JP | 2006-339092 A | 12/2006 |
| JP | 3918311 B2 | 5/2007 |
| JP | 2008-34352 A | 2/2008 |
| JP | 2008-243661 A | 10/2008 |

OTHER PUBLICATIONS

Jianxin, "Properties and Application of Polysilicon," Journal of Material Engineering, vol. 1, 1989, pp. 20-22.
Office Action for Chinese Application No. 200880115739.X, dated Jul. 3, 2013, including partial English translation.

*Primary Examiner* — Milton I Cano
*Assistant Examiner* — Sarah A Slifka
(74) *Attorney, Agent, or Firm* — Birch, Stewart, Kolasch & Birch, LLP

(57) ABSTRACT

This invention provides a negative electrode material for a rechargeable battery with a nonaqueous electrolyte, characterized in that the negative electrode material contains polycrystalline silicon particles as an active material, the particle diameter of crystallites of the polycrystalline silicon is not less than 20 nm and not more than 100 nm in terms of a crystallite size determined by the Scherrer method from the full width at half maximum of a diffraction line attributable to Si (111) around $2\theta=28.4°$ in an x-ray diffraction pattern analysis, and the true specific gravity of the silicon particles is 2.300 to 2.320.

10 Claims, 3 Drawing Sheets

1μm

200nm

1μm

1μm

NEGATIVE ELECTRODE MATERIAL FOR NONAQUEOUS ELECTROLYTE SECONDARY BATTERY

The present application is a national phase entry under 35 U.S.C. §371 of International Application No. PCT/JP2008/070272 which claims priority from Japanese Patent Application No. 2007-293486, filed Nov. 12, 2007. The entire contents of the above stated applications are incorporated herein by reference.

TECHNICAL FIELD

This invention relates to a negative electrode material for use in nonaqueous electrolyte secondary batteries, typically lithium ion secondary batteries, and more particularly to a negative electrode material for use in nonaqueous electrolyte secondary batteries, comprising specific polycrystalline silicon as the active material. It also relates to a negative electrode for use in nonaqueous electrolyte secondary batteries, comprising the negative electrode material, and a nonaqueous electrolyte secondary battery. It further relates to a method for preparing polycrystalline silicon particles useful as the active material in a negative electrode material for nonaqueous electrolyte secondary batteries.

BACKGROUND ART

In conjunction with the recent rapid advances of portable electronic equipment and communications instruments, nonaqueous electrolyte secondary batteries having a high energy density are strongly demanded from the aspects of cost, size and weight reductions. Approaches known in the art to increase the capacity of such nonaqueous electrolyte secondary batteries include, for example, use as negative electrode material of oxides of B, Ti, V, Mn, Co, Fe, Ni, Cr, Nb, and Mo and composite oxides thereof (JP 3008228 and JP 3242751: Patent Documents 1 and 2); application as negative electrode material of $M_{100-x}Si_x$ wherein x≥50 at % and M=Ni, Fe, Co or Mn which is obtained by quenching from the melt (JP 3846661: Patent Document 3); use as negative electrode material of silicon oxide (JP 2997741: Patent Document 4); and use as negative electrode material of $Si_2N_2O$, $Ge_2N_2O$ or $Sn_2N_2O$ (JP 3918311: Patent Document 5).

Silicon is regarded most promising in attaining the battery's goals of size reduction and capacity enhancement since it exhibits an extraordinarily high theoretical capacity of 4,200 mAh/g as compared with the theoretical capacity 372 mAh/g of carbonaceous materials that are currently used in commercial batteries. Silicon is known to take various forms of different crystalline structure depending on a preparation process. For example, JP 2964732 (Patent Document 6) discloses a lithium ion secondary battery using single crystal silicon as a support for negative electrode active material. JP 3079343 (Patent Document 7) discloses a lithium ion secondary battery using a lithium alloy $Li_xSi$ (0≤x≤5) with single crystal silicon, polycrystalline silicon or amorphous silicon. Of these, the lithium alloy $Li_xSi$ with amorphous silicon is preferred, which is prepared by coating crystalline silicon with amorphous silicon resulting from plasma decomposition of monosilane, followed by grinding. However, the material therein uses 30 parts of a silicon component and 55 parts of graphite as the conductive agent as described in Example, failing to take full advantage of the potential battery capacity of silicon.

Methods known to impart electric conductivity to negative electrode materials include mechanical alloying of a metal oxide such as silicon oxide with graphite and subsequent carbonization (JP-A 2000-243396: Patent Document 8); coating of Si particles on their surface with a carbon layer by chemical vapor deposition (JP-A 2000-215887: Patent Document 9); and coating of silicon oxide particles on their surface with a carbon layer by chemical vapor deposition (JP-A 2002-42806: Patent Document 10). The provision of particle surfaces with a carbon layer improves conductivity, but is not successful in overcoming the outstanding problems of silicon negative electrodes, i.e., in mitigating substantial volumetric changes associated with charge/discharge cycles or in preventing degradation of electrical conductivity and cycle performance.

Recent approaches taken for this reason include a method for restraining volume expansion by restricting the percent utilization of silicon battery capacity (JP-A 2000-215887, JP-A 2000-173596, JP 3291260, and JP-A 2005-317309: Patent Documents 9, 11 to 13), a method of quenching a melt of silicon having alumina added thereto for utilizing grain boundaries in polycrystalline particles as the buffer to volumetric changes (JP-A 2003-109590: Patent Document 14), polycrystalline particles of mixed phase polycrystals of α- and β-$FeSi_2$ (JP-A 2004-185991: Patent Document 15), and hot plastic working of a monocrystalline silicon ingot (JP-A 2004-303593: Patent Document 16).

Means for mitigating volume expansion by tailoring the layer structure of silicon active material are also disclosed, for example, disposition of two layers of silicon negative electrode (JP-A 2005-190902: Patent Document 17), and coating or encapsulating with carbon or another metal and oxide for restraining particles from spalling off (JP-A 2005-235589, JP-A 2006-216374, JP-A 2006-236684, JP-A 2006-339092, JP 3622629, JP-A 2002-75351, and JP 3622631: Patent Documents 18 to 24). Also disclosed is a method of gas phase growing silicon directly on a current collector wherein degradation of cycle performance due to volume expansion is restrained by controlling the growth direction (JP-A 2006-338996: Patent Document 25).

The method of enhancing the cycle performance of negative electrode material by coating silicon surfaces with carbon to be electrically conductive or coating silicon with an amorphous metal layer as mentioned above utilizes only about a half of the silicon's own battery capacity. There is a desire for a higher capacity. As for the polycrystalline silicon having grain boundaries, the disclosed method is difficult to control the cooling rate and hence, to reproduce consistent physical properties. There is a desire to have a negative electrode active material which can restrain the volumetric change associated with occlusion and release of lithium, mitigate a lowering of conductivity due to pulverisation by crack of particles and separation of particles from the current collector, be manufactured on a mass scale at a low cost, and comply with the application as in mobile phones where repetitive cycle performance is of high priority.

Patent Document 1: JP 3008228
Patent Document 2: JP 3242751
Patent Document 3: JP 3846661
Patent Document 4: JP 2997741
Patent Document 5: JP 3918311
Patent Document 6: JP 2964732
Patent Document 7: JP 3079343
Patent Document 8: JP-A 2000-243396
Patent Document 9: JP-A 2000-215887
Patent Document 10: JP-A 2002-42806
Patent Document 11: JP-A 2000-173596
Patent Document 12: JP 3291260
Patent Document 13: JP-A 2005-317309

Patent Document 14: JP-A 2003-109590
Patent Document 15: JP-A 2004-185991
Patent Document 16: JP-A 2004-303593
Patent Document 17: JP-A 2005-190902
Patent Document 18: JP-A 2005-235589
Patent Document 19: JP-A 2006-216374
Patent Document 20: JP-A 2006-236684
Patent Document 21: JP-A 2006-339092
Patent Document 22: JP 3622629
Patent Document 23: JP-A 2002-75351
Patent Document 24: JP 3622631
Patent Document 25: JP-A 2006-338996

DISCLOSURE OF THE INVENTION

Problem to be Solved by the Invention

An object of the invention is to provide a negative electrode material comprising polycrystalline silicon particles as an active material which maintains the high initial efficiency and battery capacity of silicon, exhibits improved cycle performance, and reduces a volume change upon charge/discharge cycles that is otherwise noticeable so that it is effective for use as the negative electrode in nonaqueous electrolyte secondary batteries; a negative electrode for nonaqueous electrolyte secondary batteries comprising the negative electrode material; and a novel nonaqueous electrolyte secondary battery. Another object is to provide a method for effectively preparing polycrystalline silicon particles useful as the active material in a negative electrode material for nonaqueous electrolyte secondary batteries.

Means for Solving the Problem

Seeking for a silicon active material having a cell capacity per volume that surpasses the capacity 844 mAh/cc of carbonaceous materials and the capacity of the Si alloy based negative electrode materials which are expected to have a capacity of 1,500 mAh/cc, the inventors have found that the above problems are overcome by a negative electrode material comprising polycrystalline silicon particles as an active material, especially prepared by pyrolysis of a silane gas as a raw material at a temperature of up to 1,000° C., the polycrystalline silicon particles including crystallites with a grain diameter of 20 nm to 100 nm and having a specific gravity of 2.300 to 2.320. The negative electrode material comprising polycrystalline silicon particles undergoes a volume expansion upon charging which is ½ to ⅓ of that of metallic silicon and ½ to ⅓ of that of polycrystalline silicon products prepared by other methods. Use of silicon particles with a drastically reduced volume expansion provides an electrode density of 0.5 to 0.9 g/cm³ in the charged state despite a high capacity, leading to an increased battery capacity per volume. By doping with boron or phosphorus, electric conductivity may be improved. Use of a polyimide resin as a binder may prevent the negative electrode material from being broken and pulverized by repeated expansion and shrink during charge/discharge cycles, ensuring that the electrode itself does not lose its conductivity. When this negative electrode material is used to construct a nonaqueous electrolyte secondary battery, the resultant nonaqueous electrolyte secondary battery exhibits excellent cycle performance. The present invention is predicated on these findings.

Accordingly, the invention provides a negative electrode material for use in nonaqueous electrolyte secondary batteries, a negative electrode, a secondary battery, and a method for effectively preparing polycrystalline silicon particles useful as a negative electrode active material.

[1] A negative electrode material for nonaqueous electrolyte secondary batteries, characterized in that the negative electrode material comprises polycrystalline silicon particles as an active material, crystallites of the polycrystalline silicon have a grain diameter of 20 nm to 100 nm in terms of a crystallite size determined by the Scherrer method from the full width at half maximum of a diffraction peak attributable to Si(111) around $2\theta=28.4°$ in x-ray diffraction pattern analysis, and the silicon particles have a true specific gravity of 2.300 to 2.320.

[2] A negative electrode material for nonaqueous electrolyte secondary batteries according to [1], further comprising a binder.

[3] A negative electrode material for nonaqueous electrolyte secondary batteries according to [2], wherein the binder is a polyimide resin.

[4] A negative electrode material for nonaqueous electrolyte secondary batteries according to [2] or [3], comprising the polycrystalline silicon particles in a proportion of 60 to 97% by weight, the binder in a proportion of 3 to 20% by weight, and a conductive agent in a proportion of 0 to 37% by weight.

[5] A negative electrode material for nonaqueous electrolyte secondary batteries according to [4], wherein the conductive agent is present in a proportion of 1 to 37% by weight and incorporated as a dispersion of the conductive agent which has undergone dispersion treatment.

[6] A negative electrode material for nonaqueous electrolyte secondary batteries according to any one of [1] to [5], wherein the polycrystalline silicon particles contain 0.1 to 100 ppm of at least one dopant selected from boron, phosphorus and arsenic.

[7] A negative electrode material for nonaqueous electrolyte secondary batteries according to any one of [1] to [6], wherein the polycrystalline silicon particles have been prepared by pyrolysis of a silane gas as a raw material at a temperature of up to 1,000° C.

[8] A negative electrode material for nonaqueous electrolyte secondary batteries according to [7], wherein the polycrystalline silicon particles have been prepared as particulate polycrystalline silicon by pyrolysis of a silane gas in a fluidized bed.

[9] A negative electrode material for nonaqueous electrolyte secondary batteries according to [7] or [8], wherein the silane gas comprises a silane or chlorosilane.

[10] A negative electrode material for nonaqueous electrolyte secondary batteries according to [9], wherein the silane is monosilane.

[11] A negative electrode material for nonaqueous electrolyte secondary batteries according to [9], wherein the chlorosilane is dichlorosilane.

[12] A negative electrode for nonaqueous electrolyte secondary batteries, characterized in that the negative electrode comprises a negative electrode material for nonaqueous electrolyte secondary batteries according to any one of [1] to [11], wherein the thickness change of the negative electrode is not more than 3 times before and after charging.

[13] A nonaqueous electrolyte secondary battery comprising a negative electrode form comprising a negative electrode for nonaqueous electrolyte secondary batteries according to [12], a positive electrode form, a separator, and a nonaqueous electrolyte.

[14] A nonaqueous electrolyte secondary battery according to [13] which is a lithium ion secondary battery.

[15] A method for preparing polycrystalline silicon particles for use as an active material in negative electrode material for nonaqueous electrolyte secondary batteries, characterized by the step of pyrolyzing a silane gas as a raw material at a temperature of up to 1,000° C.

[16] A method for preparing polycrystalline silicon particles for use as an active material in negative electrode material for nonaqueous electrolyte secondary batteries according to [15], wherein pyrolysis of a silane gas is effected in a fluidized bed.

[17] A method for preparing polycrystalline silicon particles for use as an active material in negative electrode material for nonaqueous electrolyte secondary batteries according to [15] or [16], wherein the silane gas comprises a silane or chlorosilane.

[18] A method for preparing polycrystalline silicon particles for use as an active material in negative electrode material for nonaqueous electrolyte secondary batteries according to [17], wherein the silane is monosilane.

[19] A method for preparing polycrystalline silicon particles for use as an active material in negative electrode material for nonaqueous electrolyte secondary batteries according to [17], wherein the chlorosilane is dichlorosilane.

[20] A method for preparing polycrystalline silicon particles for use as an active material in negative electrode material for nonaqueous electrolyte secondary batteries according to any one of [15] to [19], wherein the polycrystalline silicon particles resulting from pyrolysis of a silane gas as a raw material at a temperature of up to 1,000° C. are heat treated in a non-oxidizing atmosphere containing diborane, phosphine or arsine at a temperature of up to 1,000° C.

Advantageous Effects of the Invention

According to the invention, a lithium ion secondary battery negative electrode is provided which maintains the high initial efficiency and battery capacity of silicon, has improved cycle performance, and reduces a volume change upon charge/discharge cycles that is otherwise noticeable. When a nonaqueous electrolyte secondary battery negative electrode material comprising polycrystalline silicon particles as an active material is used, a nonaqueous electrolyte secondary battery is provided which has improved adhesion to a current collector, a high initial efficiency, and a mitigated volume change upon charge/discharge cycles, leading to improved cycle performance and efficiency. A method for effectively preparing polycrystalline silicon particles useful as a negative electrode active material is also provided.

BEST MODE FOR CARRYING OUT THE INVENTION

Figure 1:
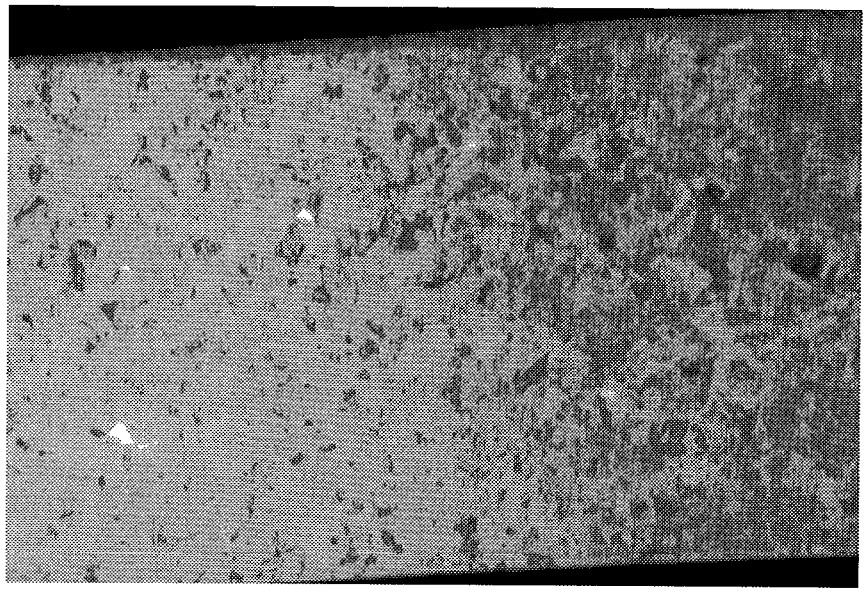
FIG. 1 is a TEM image (×15,000) showing the crystal structure of polycrystalline silicon according to the invention.

The nonaqueous electrolyte secondary battery negative electrode material of the invention comprises as an active material polycrystalline silicon, especially prepared from a silane gas as a raw material. It is obtainable using silicon particles in which the crystal structure of polycrystalline silicon is a layer structure of single crystal grains.

It is known that silicon is divided into single crystal silicon, polycrystalline silicon, and amorphous silicon in terms of crystallinity, and into chemical grade silicon and metallurgical grade silicon in terms of purity. The polycrystalline silicon consists of partially ordered crystals. On the other hand, the amorphous silicon differs in that it assumes a substantially disordered arrangement of silicon atoms having a network structure, while amorphous silicon can be transformed into polycrystalline silicon by heat aging. The polycrystalline silicon consists of relatively large crystal grains of different orientation, with boundaries being present between individual crystal grains. As described in Complete Series of Inorganic Chemistry, Vol. XII-2, Silicon (Maruzen Co., Ltd.), p184, polycrystalline silicon can be synthesized from monosilane or trichlorosilane. The current mainstream processes for producing polycrystalline silicon in an industrial manner are the Siemens process and Komatsu-ASiMI process involving pyrolysis of trichlorosilane or monosilane in a precipitating reactor (or bell jar) and depositing in a silicon rod form. The ethyl process involving using a fluidized bed reactor and growing polycrystalline silicon on surfaces of silicon particles is also available. Also known are a method for preparing polycrystalline silicon by melting metallic silicon and directionally solidifying the melt, for thereby causing segregation of impurities and increasing the purity, and a method for preparing polycrystalline silicon by quenching the silicon melt. It is known that polycrystalline silicon products thus synthesized differ in electric conductivity and residual strain depending on the size and orientation of crystal grains.

The polycrystalline silicon which is useful in nonaqueous electrolyte secondary batteries according to the invention is one produced through pyrolysis of a silane gas (i.e., silane or chlorosilane) in a relatively low temperature range of up to 1,000° C., and crystal growth. The products obtained by heating at or above the melting point of silicon and directionally solidifying the silicon melt and the product obtained by hot plastic deformation of a silicon ingot are excluded. The production processes used herein include the Siemens, Komatsu-ASiMI, and ethyl processes, mentioned above. The Siemens and Komatsu-ASiMI processes are batchwise in that polycrystalline silicon is precipitated on a surface of a silicon rod. Because polycrystalline silicon growing on the rod surface undergoes recrystallization, relatively large crystal grains are likely to form.

On the other hand, the process using a fluidized bed reactor, known as the ethyl process, is characterized by a high productivity, effective gas-solid heat transfer, and a uniform heat distribution within the reactor because polycrystalline silicon is grown on particle surfaces so that a large specific surface area is available for reaction. Since polycrystalline silicon particles growing to a particular particle size corresponding to the linear velocity of the fluidized bed reactor are discharged from within the reactor, continuous reaction is possible. Since the growth of crystallites is slow, relatively small crystal grains are likely to form.

Examples of the silane or chlorosilane used in the production processes described above include monosilane, disilane, monochlorosilane, dichlorosilane, trichlorosilane and tetrachlorosilane. The growth temperature of polycrystalline silicon on a rod is around 850° C. when monosilane is used and around 1,100° C. when trichlorosilane is used. Preference is given to monosilane and dichlorosilane which can be decomposed at temperatures below 1,000° C. The fluidized bed process using monosilane operates at a further lower temperature of 600 to 800° C. and typically around 650° C. because operation at higher temperatures causes fine particles to form as a result of decomposition and growth in the vapor phase. The use of monosilane or dichlorosilane as raw material gas enables to maintain the reactor at a relatively low temperature, and the use of a fluidized bed reactor as the reaction system enables to reduce the residence time within the fluidized bed reactor and to slow down the crystal growth of polycrystalline silicon being deposited. As a result, fully densified crystal grains are formed, and fine voids are defined between crystal grains being deposited one on another. It is believed that these fine voids function to mitigate the volume expansion and restrain cleavage upon charging.

One effective physical measure for rating crystal grains of polycrystalline silicon is measurement of crystallites by X-ray diffractometry. On analysis of X-ray diffraction pattern of the X-ray diffractometry standard reference material SRM 640c (silicon) by NIST, the diameter of crystallites is determined by the Scherrer method from the full width at half maximum (FWHM) of a diffraction curve assigned to Si(111) around $2\theta=28.4°$. Crystallites of polycrystalline silicon produced from monosilane or dichlorosilane, for the most part, have a size of 20 to 100 nm. A crystallite size of 20 to 80 nm is preferred, and polycrystalline silicon particles produced by pyrolysis of monosilane in a fluidized bed fall in that range. On the other hand, crystallites produced from trichlorosilane have a size of 150 to 300 nm, with an increase of crystallite size being observed. Besides, metallic silicon and polycrystalline silicon products obtained by directional solidification, quenching and hot plastic working processes have a crystallite size of 500 to 700 nm, which is undesired for the non-aqueous electrolyte secondary battery application contemplated herein.

The polycrystalline silicon produced in the fluidized bed reactor, for the most part, has a true specific gravity of 2.300 to 2.320, which is very low as compared with single crystal silicon, implying the presence of fine voids within silicon particles. On the other hand, polycrystalline silicon produced from trichlorosilane by the Siemens process, polycrystalline silicon produced from monosilane by the Komatsu-ASiMI process, and metallic silicon have a true specific gravity in the range of 2.320 to 2.340, which is substantially equal to single crystal silicon, implying a densified crystal structure within particles.

The polycrystalline silicon produced by the aforementioned process has chemically bonded hydrogen atoms. Its silicon purity can be improved typically by heat treatment at 1,000 to 1,200° C. for a brief time of about 2 to 4 hours. The hydrogen content which is normally about 600 to 1,000 ppm prior to the heat treatment may be reduced to or below 30 ppm by the heat treatment. Preferred for use in the negative electrode material is polycrystalline silicon which has been purified to a hydrogen content of up to 30 ppm by heat treatment.

Also the polycrystalline silicon may contain one or more dopants selected from boron, phosphorus and arsenic. In general, metallic silicon of the metallurgical grade containing boron, phosphorus, oxygen, aluminum, iron, calcium or the like is more electroconductive than the polycrystalline silicon produced by the aforementioned process. Doping of polycrystalline silicon with the above elements improves the conductivity of polycrystalline silicon, which becomes a negative electrode material having improved bulk conductivity. The doping techniques include a technique of adding a gas selected from diborane ($B_2H_6$), phosphine ($PH_3$) and arsine ($AsH_3$) to the silane gas while precipitating polycrystalline silicon and a technique of once preparing polycrystalline silicon, exposing it to the atmosphere of the dopant gas, and allowing for diffusion. The treatment may be often achieved at the pyrolysis temperature of silane gas. In the case of phosphine, for example, it may be fully decomposed at the pyrolysis temperature of monosilane because its pyrolysis temperature is 375° C.

Where the particle size of polycrystalline silicon is controlled by grinding and classification prior to use, the step of doping by exposure to the dopant source gas atmosphere is preferably conducted after grinding and classification of polycrystalline silicon. This increases uniformity in doping level among particles. In the embodiment wherein doping treatment in a non-oxidizing atmosphere of the dopant source gas is carried out after the particle size of polycrystalline silicon is controlled by grinding and classification, the treatment temperature is preferably lower than or equal to 1,000° C. In this doping treatment, doping takes place from surfaces of polycrystalline silicon particles, and in order to drive doping into the particle interior, it is necessary to promote diffusion of the dopant at the surface into the particle interior. One effective means for promoting diffusion is by elevating the treatment temperature. However, if the temperature is elevated beyond 1,000° C., then polycrystalline silicon begins to increase the crystallite grain size, which is undesired because the effect of reducing the volume change during charge/discharge operation is deteriorated.

To achieve the desired effect, the amount of dopant added is preferably 0.1 to 100 ppm in total of the dopant based on the weight of doped polycrystalline silicon. If the doping level is less than 0.1 ppm, a sufficient increase of electric conductivity is not observable. A doping level in excess of 100 ppm is not preferred because a lowering of charge/discharge capacity is observable. A doping level of about 0.5 to 10 ppm is preferred when the desired effect of improving conductivity and economy are taken into account.

The polycrystalline silicon thus produced is further ground into particles prior to use. Provided that the particle size is a volume average value $D_{50}$ (which is a particle diameter at 50% by volume cumulative or median diameter) in the particle size distribution measurement by the laser diffraction scattering method, the silicon particles may have a particle size distribution with $D_{50}$ of 0.1 μm to 50 μm and more preferably 5 μm to 20 μm. A smaller average particle size corresponds to a larger specific surface area which may lead to a lower negative electrode film density whereas particles with a larger particle size may penetrate through a negative electrode film, causing short-circuits.

To produce polycrystalline silicon particles of the predetermined size, any well-known grinding machine may be used in combination with a classifier. The grinding machines which can be used herein include, for example, a ball mill and media agitating mill in which grinding media such as balls or beads are brought in motion and the charge (to be ground) is ground by utilizing impact forces, friction forces or compression forces generated by the kinetic energy; a roller mill in which grinding is carried out by compression forces generated between rollers; a jet mill in which the charge is impinged against the liner or each other at a high speed, and grinding is carried out by impact forces generated by impingement; a hammer mill, pin mill and disc mill in which a rotor with hammers, blades or pins attached thereto is rotated and the charge is ground by impact forces generated by rotation; a colloid mill utilizing shear forces; and a wet, high pressure, counter-impingement dispersing machine "Ultimizer." Either wet or dry grinding may be employed. The grinding may be followed by dry, wet or sieve classification in order to gain a proper particle size distribution. The dry classification generally uses a gas stream and includes successive or simultaneous steps of dispersion, separation (segregation between fine and coarse particles), collection (separation between solid and gas), and discharge. To prevent the classification efficiency from being reduced by the impacts of interference between particles, particle shape, turbulence and velocity distribution of the gas stream, electrostatic charges, or the like, pretreatment (adjustment of water content, dispersibility, humidity or the like) may be carried out prior to the classification, or the gas stream may be adjusted in moisture content and oxygen concentration prior to use. An integrated type of dry grinder/classifier may also be used which can conduct grinding and classifying operations at a time to deliver an output of the desired particle size distribution.

Once polycrystalline silicon particles are ground to the predetermined particle size, a carbon film may be deposited on surfaces of the particles by hot chemical vapor deposition (CVD) treatment wherein a hydrocarbon compound gas and/or vapor is introduced under atmospheric pressure or reduced pressure, and CVD is effected at a temperature of 600 to 1,200° C., preferably 800 to 1,100° C., for as short a time as possible.

The polycrystalline silicon powder thus obtained may be used as the active material for nonaqueous electrolyte secondary battery negative electrodes. It has many advantages including a high capacity as compared with the currently used graphite and the like, a high initial efficiency as compared with silicon oxide and silicon oxide-derived materials (e.g., silicon/silicon dioxide dispersed composite resulting from disproportionation of silicon oxide), controlled volumetric changes associated with charge/discharge cycles as compared with silicon itself, and improved adhesion between particles and the binder. These advantages ensure fabrication of a nonaqueous electrolyte secondary battery, especially lithium ion secondary battery, having improved cycle performance.

When a negative electrode is manufactured from a negative electrode material comprising polycrystalline silicon particles as active material, a binder is used, which is preferably selected from polyimide resins, especially aromatic polyimide resins. The aromatic polyimide resin binder is preferred because it has good solvent resistance and may comply with a volume expansion by charge/discharge cycles to prevent peeling of the negative electrode from the current collector and separation of the active material.

The aromatic polyimide resins are generally difficultly soluble in organic solvents and must not be swollen or dissolved in electrolytic solution. In general, aromatic polyimide resins are soluble only in high-boiling organic solvents, for example, cresol. Thus an electrode paste may be prepared by adding a polyamic acid, polyimide precursor which is relatively easily soluble in many organic solvents such as dimethylformamide, dimethylacetamide, N-methylpyrrolidone, ethyl acetate, acetone, methyl ethyl ketone, methyl isobutyl ketone, and dioxolan, and heat treating at a temperature of at least 300° C. for a long time for thereby effecting dehydration and imidization, thus forming a polyimide binder.

Suitable aromatic polyimide resins are those having a basic skeleton derived from tetracarboxylic dianhydrides and diamines. Suitable tetracarboxylic dianhydrides include aromatic tetracarboxylic dianhydrides such as pyromellitic dianhydride, benzophenonetetracarboxylic dianhydride and biphenyltetracarboxylic dianhydride, alicyclic tetracarboxylic dianhydrides such as cyclobutanetetracarboxylic dianhydride, cyclopentanetetracarboxylic dianhydride and cyclohexanetetracarboxylic dianhydride, and aliphatic tetracarboxylic dianhydrides such as butanetetracarboxylic dianhydride.

Suitable diamines include aromatic, alicyclic and aliphatic diamines such as, for example, p-phenylene diamine, m-phenylene diamine, 4,4'-diaminodiphenylmethane, 4,4'-diaminodiphenyl ether, 2,2'-diaminodiphenylpropane, 4,4'-diaminodiphenyl sulfone, 4,4'-diaminobenzophenone, 2,3-diaminonaphthalene, 1,3-bis(4-aminophenoxy)benzene, 1,4-bis(4-aminophenoxy)benzene, 4,4'-di(4-aminophenoxy)diphenyl sulfone, 2,2'-bis[4-(4-aminophenoxy)phenyl] propane.

Synthesis of polyamic acid intermediate is generally carried out by a solution polymerization process. The process uses a solvent such as N,N'-dimethylformamide, N,N'-dimethylacetamide, N-methyl-2-pyrrolidone, N-methylcaprolactam, dimethyl sulfoxide, tetramethyl urea, pyridine, dimethyl sulfone, hexamethylphosphoramide, and butyrolactone, alone or in admixture.

The reaction temperature is generally in the range of −20° C. to 150° C., and preferably −5° C. to 100° C.

The polyamic acid intermediate is converted into a polyimide resin typically by heating to induce dehydration and cyclization. Heating for dehydration and cyclization may be at any temperature in the range of 140 to 400° C. and preferably 150 to 250° C. The time taken for dehydration and cyclization is 30 seconds to 10 hours, and preferably 5 minutes to 5 hours, depending on the reaction temperature.

As the polyimide resin, polyimide resins in powder form and solutions of polyimide precursors in N-methylpyrrolidone are commercially available. Examples include U-Varnish A, U-Varnish S, UIP-R and UIP-S from Ube Industries Ltd., Kayaflex KPI-121 from Nippon Kayaku Co., Ltd., and Rikacoat SN-20, PN-20 and EN-20 from New Japan Chemical Co., Ltd.

In the negative electrode material, the polycrystalline silicon particles are present in an amount of 60 to 97%, more preferably 70 to 95%, and even more preferably 75 to 95% by weight. When a conductive agent to be described later is compounded, the amount of the polycrystalline silicon is up to 96%, preferably up to 94%, and more preferably up to 93% by weight. An amount of the binder blended is 3 to 20%, and preferably 5 to 15% by weight based on the entire negative electrode material. Less amounts of the binder may allow the negative electrode active material to separate apart whereas excessive amounts may reduce the percent voids and thicken a dielectric fraction to interfere with migration of lithium ions.

When a negative electrode material is prepared using the polycrystalline silicon particles as the active material and a polyimide resin as the binder, a conductive agent such as graphite may be added. The type of conductive agent used herein is not particularly limited as long as it is an electronic conductive material which does not undergo decomposition or alteration in the battery. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins. The conductive agent is preferably used in solvent dispersion form because an electrode paste in which the conductive agent is uniformly distributed and bonded to silicon particles is obtained by previously dispersing the conductive agent in a solvent such as water or N-methyl-2-pyrrolidone and adding the dispersion to the active material. Any well-known surfactant may be added to help disperse the conductive agent in the solvent. The solvent used for conductive agent dispersion is desirably the same as the solvent used for the binder.

The conductive agent is added in an amount of 0 to 37% by weight based on the negative electrode material. The amount of conductive agent, when added, is preferably 1 to 37%, more preferably 1 to 20%, and even more preferably 2 to 10% by weight. If the amount of the conductive agent is too small, the negative electrode material may have a poor conductivity, tending to exhibit a higher initial resistivity. An excessive amount of the conductive agent may lead to a loss of battery capacity.

Besides the polyimide resin binder, carboxymethyl cellulose, sodium polyacrylate, acrylic polymers or fatty acid esters may be added as a viscosity regulator to the negative electrode material.

From the negative electrode material for nonaqueous electrolyte secondary batteries, a negative electrode (shaped form) may be prepared, for example, by the following procedure. The negative electrode is prepared by combining the active material, conductive agent, binder, and additives, kneading them in a solvent suitable for dissolution and dispersion of the binder such as water or N-methylpyrrolidone to form a paste-like mix, and applying the mix in sheet form to a current collector. The current collector used herein may be a foil of any material which is commonly used as the negative electrode current collector, for example, a copper or nickel foil while the thickness and surface treatment thereof are not particularly limited. The method of shaping or molding the mix into a sheet is not particularly limited, and any well-known method may be used. Preferably the negative electrode comprising the negative electrode material experiences the film thickness change of not more than 3 times before and after charging, more preferably the film thickness change of not more than 2.5 times before and after charging.

A nonaqueous electrolyte secondary battery may be fabricated from the negative electrode (shaped form) thus obtained. The nonaqueous electrolyte secondary battery is characterized by the use of the negative electrode active material defined herein, while other components including positive electrode (shaped form), separator, electrolytic solution and nonaqueous electrolyte, and the battery shape are not particularly limited.

The positive electrode active materials include oxides and sulfides which are capable of storing and releasing lithium ions. They may be used alone or in admixture. Examples include sulfides and oxides of metals excluding lithium such as $TiS_2$, $MoS_2$, $NbS_2$, $ZrS_2$, $VS_2$, $V_2O_5$, $MoO_3$, $Mg(V_3O_8)_2$, and lithium and lithium-containing complex oxides. Composite metals such as $NbSe_2$ are also useful. For increasing the energy density, lithium complex oxides based on $Li_pMetO_2$ are preferred wherein Met is preferably at least one element of cobalt, nickel, iron and manganese and p has a value in the range: $0.05 \leq p \leq 1.10$. Illustrative examples of the lithium complex oxides include $LiCoO_2$, $LiNiO_2$, $LiFeO_2$, and $Li_qNi_rCo_{1-r}O_2$ (wherein q and r have values varying with the charged/discharged state of the battery and usually in the range: $0 < q < 1$ and $0.7 < r \leq 1$) having a layer structure, $LiMn_2O_4$ having a spinel structure, and rhombic $LiMnO_2$. Also used for high voltage operation is a substitutional spinel type manganese compound: $LiMet_sMn_{1-s}O_4$ wherein Met is titanium, chromium, iron, cobalt, nickel, copper, zinc or the like and s has a value in the range: $0 < s < 1$.

It is noted that the lithium complex oxide described above may be prepared, for example, by grinding and mixing a carbonate, nitrate, oxide or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, poly-p-phenylene, polyaniline, polythiophene, polyacene, and polysulfide.

From the positive electrode active material, a positive electrode (shaped form) may be prepared by a well-known method, specifically by mixing the active material with a conductive agent and a binder (as used in the negative electrode mix) and applying the mix to a current collector.

The separator disposed between the positive and negative electrodes is not particularly limited as long as it is stable to the electrolytic solution and holds the solution effectively. The separator is most often a porous sheet or non-woven fabric of polyolefins such as polyethylene, polypropylene and copolymers thereof and aramide resins. Such sheets may be used as a single layer or a laminate of multiple layers. Ceramics such as metal oxides may be deposited on the surface of sheets. Porous glass and ceramics are employed as well.

The solvent used in nonaqueous electrolyte secondary batteries is not particularly limited as long as it can serve for the nonaqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing solvent for nonaqueous electrolytic solution.

Where a solid electrolyte or gel electrolyte is desired, a silicone gel, silicone polyether gel, acrylic gel, silicone acrylic gel, acrylonitrile gel, poly(vinylidene fluoride) or the like may be included as polymer component. These ingredients may be polymerized prior to or after casting. They may be used alone or in admixture.

Exemplary of the electrolyte salt used herein are light metal salts. Examples of the light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

From the electric conductivity aspect, the electrolyte salt is preferably present in a concentration of 0.5 to 2.0 mole/liter of the nonaqueous electrolytic solution. The electrolyte should preferably have a conductivity of at least 0.01 S/cm at a temperature of 25° C., which may be adjusted in terms of the type and concentration of the electrolyte salt.

If desired, various additives may be added to the nonaqueous electrolytic solution. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

The nonaqueous electrolyte secondary battery may take any desired shape without particular limits. In general, the battery is of the coin type wherein electrodes and a separator, all punched into coin shape, are stacked, or of the prismatic or cylinder type wherein electrode sheets and a separator are spirally wound.

EXAMPLE

Preparation Examples, Examples, and Comparative Examples are given below for further illustrating the invention, but they are not to be construed as limiting the invention thereto. In Examples, all percents (%) are by weight, and the average particle size is a 50% volume cumulative diameter $D_{50}$ (or median diameter) as determined by particle size distribution measurement utilizing laser light diffractometry.

Preparation of Negative Electrode Active Material #1

Figure 2:
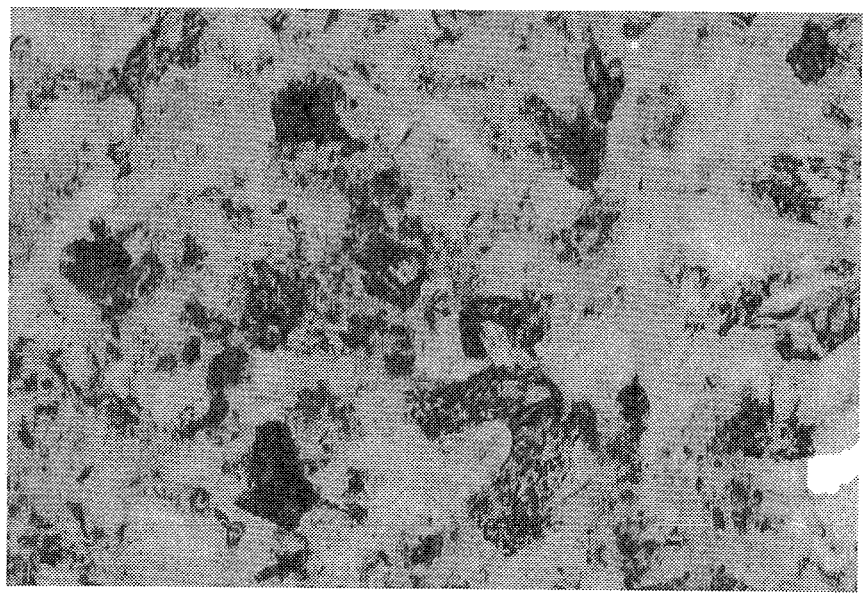
FIG. 2 is a TEM image (×60,000) showing crystal grains of polycrystalline silicon according to the invention.

Particulate polycrystalline silicon was prepared by admitting polycrystalline silicon fine particles and feeding monosilane into a fluidized bed at an internal temperature of 800° C. The particulate polycrystalline silicon was ground in a jet mill (AFG-100 by Hosokawa Micron Group) with the built-in classifier operating at 7,200 rpm. Subsequent classification on a classifier (TC-15 by Nisshin Engineering Co., Ltd.) yielded a polycrystalline silicon powder with $D_{50}$=10.2 μm. The powder had a crystallite size of 44 nm as determined by the Scherrer method from the FWHM of XRD spectral analysis. It also had a true specific gravity of 2.308. FIG. 1 is a TEM image in section of a particle. FIG. 2 is an enlarged TEM image of crystal grains.

Preparation of Negative Electrode Active Material #2

The particulate polycrystalline silicon powder prepared as negative electrode active material #1 was treated in an argon stream containing 5 ppm (by weight) of phosphine at 1,000° C. for 3 hours, yielding a polycrystalline silicon powder doped with 0.8 ppm of phosphorus (based on the weight of the doped polycrystalline silicon). The powder had a crystallite size of 95 nm as determined by the Scherrer method from the FWHM of XRD spectral analysis. It also had a true specific gravity of 2.317.

Preparation of Negative Electrode Active Material #3

The particulate polycrystalline silicon powder prepared as negative electrode active material #1 was treated in an argon stream containing 3 ppm (by weight) of diborane at 1,000° C. for 3 hours, yielding a polycrystalline silicon powder doped with 1.4 ppm of boron (based on the weight of the doped polycrystalline silicon). The powder had a crystallite size of 98 nm as determined by the Scherrer method from the FWHM of XRD spectral analysis. It also had a true specific gravity of 2.318.

Preparation of Negative Electrode Active Material #4

The particulate polycrystalline silicon powder prepared as negative electrode active material #1 was treated in an argon stream at 1,000° C. for 3 hours, yielding a polycrystalline silicon powder having undergone thermal hysteresis. The powder had a crystallite size of 94 nm as determined by the Scherrer method from the FWHM of XRD spectral analysis. It also had a true specific gravity of 2.318.

Preparation of Comparative Negative Electrode Active Material #1

Figure 3:
FIG. 3 is a TEM image (×12,000) showing the crystal structure of comparative negative electrode active material #1.

Rod-like polycrystalline silicon was prepared by placing a polycrystalline silicon slug in a heating container at an internal temperature of 800° C. and feeding monosilane thereto. It was crushed by a jaw crusher and ground in a jet mill (AFG-100 by Hosokawa Micron Group) with the built-in classifier operating at 7,200 rpm. Subsequent classification on a classifier (TC-15 by Nisshin Engineering Co., Ltd.) yielded a polycrystalline silicon powder with $D_{50}$=9.8 μm. The powder had a crystallite size of 149 nm as determined by the Scherrer method from the FWHM of XRD spectral analysis. It also had a true specific gravity of 2.326. FIG. 3 is a TEM image in section of a particle.

Preparation of Comparative Negative Electrode Active Material #2

Figure 4:
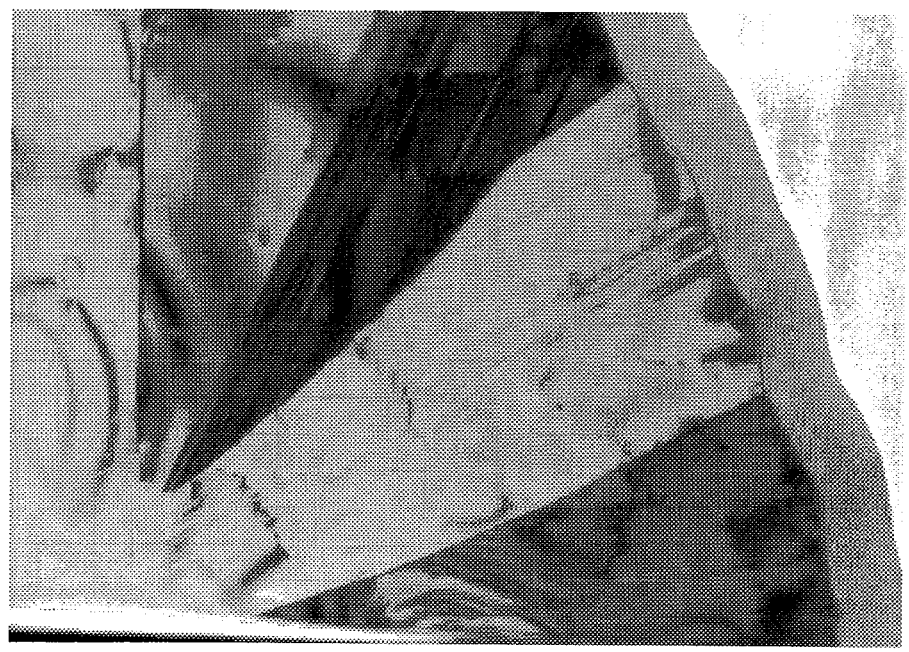
FIG. 4 is a TEM image (×12,000) showing the crystal structure of comparative negative electrode active material #2.
Figure 5:
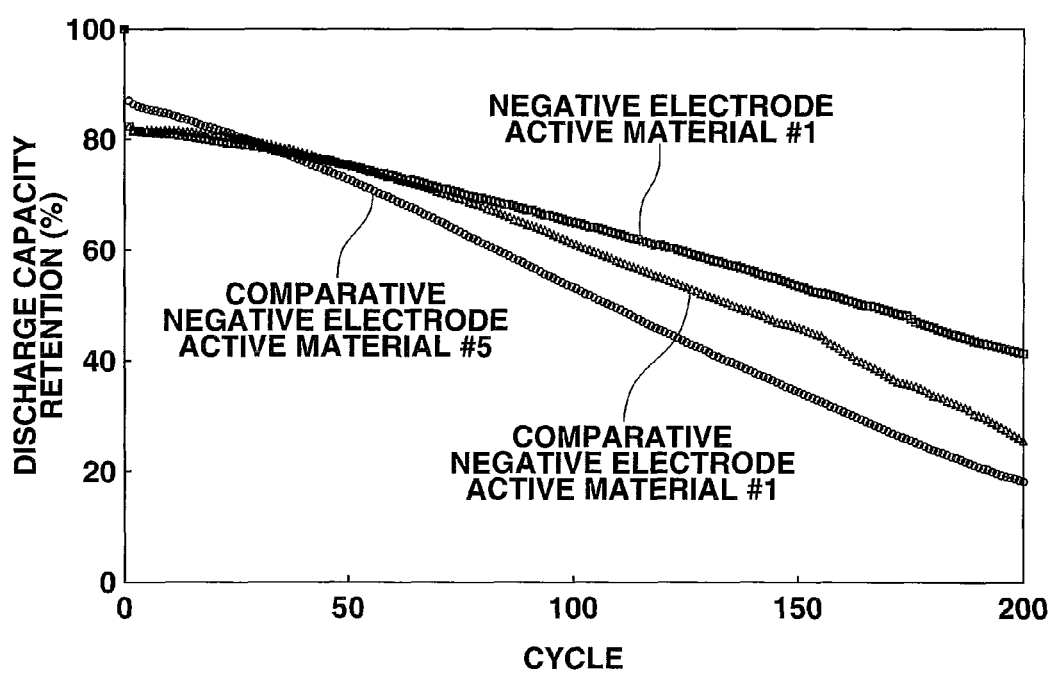
FIG. 5 is a diagram showing in comparison discharge capacity changes in a charge/discharge test.

A polycrystalline silicon slug was prepared by pyrolysis of trichlorosilane at 1,100° C. It was crushed by a jaw crusher and ground in a jet mill (AFG-100 by Hosokawa Micron Group) with the built-in classifier operating at 7,200 rpm. Subsequent classification on a classifier (TC-15 by Nisshin Engineering Co., Ltd.) yielded a polycrystalline silicon powder with $D_{50}$=10.0 μm. The powder had a crystallite size of 212 nm as determined by the Scherrer method from the FWHM of XRD spectral analysis. It also had a true specific gravity of 2.326. FIG. 4 is a TEM image in section of a particle.

Preparation of Comparative Negative Electrode Active Material #3

A silicon ingot which had been purified by unidirectional solidification was admitted into a carbon crucible lined with boron nitride where it was melted in an argon atmosphere by heating at 1,600° C. The melt was atomized along with argon gas under pressure through a nozzle with a diameter of 1.5 mm. The resulting spherical particles having a particle size of 20 μm were ground in a jet mill (AFG-100 by Hosokawa Micron Group) with the built-in classifier operating at 7,200 rpm. Subsequent classification on a classifier (TC-15 by Nisshin Engineering Co., Ltd.) yielded a polycrystalline silicon powder with $D_{50}$=10.5 μm. The powder had a crystallite size of 590 nm as determined by the Scherrer method from the FWHM of XRD spectral analysis. It had a true specific gravity of 2.335.

Preparation of Comparative Negative Electrode Active Material #4

A silicon test piece of 35 mm in diameter and 50 mm in height which had been purified by unidirectional solidification was hot plastic worked at 1300° C. and a strain rate of $5\times10^{-5}$/sec. Pressing to 10 mm was immediately followed by cooling (8° C./min). It was ground in a jet mill (AFG-100 by Hosokawa Micron Group) with the built-in classifier operating at 7,200 rpm. Subsequent classification on a classifier (TC-15 by Nisshin Engineering Co., Ltd.) yielded a polycrystalline silicon powder with $D_{50}$=10.5 μm. The powder had a crystallite size of 700 nm as determined by the Scherrer method from the FWHM of XRD spectral analysis. It had a true specific gravity of 2.334.

Preparation of Comparative Negative Electrode Active Material #5

A metallic silicon ingot (product by ELKEM) was ground in a jet mill (AFG-100 by Hosokawa Micron Group) with the built-in classifier operating at 7,200 rpm. Subsequent classification on a classifier (TC-15 by Nisshin Engineering Co., Ltd.) yielded a metallic silicon powder with $D_{50}$=10.1 μm. The powder had a crystallite size of 690 nm as determined by the Scherrer method from the FWHM of XRD spectral analysis. It had a true specific gravity of 2.335.

Preparation of Comparative Negative Electrode Active Material #6

The particulate polycrystalline silicon powder prepared as negative electrode active material #1 was treated in an argon stream containing 5 ppm (by weight) of phosphine at 1,300° C. for 3 hours, yielding a polycrystalline silicon powder doped with 2.1 ppm of phosphorus (based on the weight of the doped polycrystalline silicon). The powder had a crystallite size of 107 nm as determined by the Scherrer method from the FWHM of XRD spectral analysis. It also had a true specific gravity of 2.325.

Preparation of Comparative Negative Electrode Active Material #7

The particulate polycrystalline silicon powder prepared as negative electrode active material #1 was treated in an argon stream containing 3 ppm (by weight) of diborane at 1,300° C. for 3 hours, yielding a polycrystalline silicon powder doped with 1.6 ppm of boron (based on the weight of the doped polycrystalline silicon). The powder had a crystallite size of 109 nm as determined by the Scherrer method from the FWHM of XRD spectral analysis. It also had a true specific gravity of 2.326.

Preparation of Comparative Negative Electrode Active Material #8

The particulate polycrystalline silicon powder prepared as negative electrode active material #1 was treated in an argon stream containing 100 ppm (by weight) of phosphorus oxychloride at 900° C. for 3 hours, yielding a polycrystalline silicon powder doped with 35 ppm of phosphorus (based on the weight of the doped polycrystalline silicon). The powder had a crystallite size of 93 nm as determined by the Scherrer method from the FWHM of XRD spectral analysis. It also had a true specific gravity of 2.329.

Preparation of Comparative Negative Electrode Active Material #9

The particulate polycrystalline silicon powder prepared as negative electrode active material #1 was treated in an argon stream at 1,300° C. for 3 hours, yielding a polycrystalline silicon powder. The powder had a crystallite size of 110 nm as determined by the Scherrer method from the FWHM of XRD spectral analysis. It also had a true specific gravity of 2.325.

The crystallite size, true specific gravity, resistivity, and $D_{50}$ of the polycrystalline silicon samples obtained above are tabulated in Table 1. It is noted that the true specific gravity of polycrystalline silicon was measured by the gas adsorption method (pycnometer) using helium gas, and the resistivity was measured by the AC impedance method using four terminals.

A comparison between negative electrode active material #1 and comparative negative electrode active materials #1 to #5 in terms of the crystallite size and true specific gravity of polycrystalline silicon reveals that preparation of polycrystalline silicon in a fluidized bed by pyrolysis of monosilane at or below 1,000° C. is preparation under the best conditions. A comparison between negative electrode active materials #1 to #4 and comparative negative electrode active materials #6 to #9 reveals that secondary treatment at or below 1,000° C. is successful in providing a crystallite size of up to 100 nm and a true specific gravity of 2.300 to 2.320.

With respect to resistivity, negative electrode active materials #2, #3 and comparative negative electrode active materials #6 to #8 showed drops of bulk resistance due to doping as compared with negative electrode active material #1. On the other hand, negative electrode active material #4 having undergone only heat treatment kept the resistivity unchanged. When a comparison is made with the method of preparing metallic silicon, a difference of significance due to difference in purity is recognized between the polycrystalline silicon group consisting of negative electrode active material #1 and comparative negative electrode active materials #1 to #4 and comparative negative electrode active material #5 resulting from chemical grade metallic silicon. That is, comparative negative electrode active material #5 containing more impurities showed the lowest value of resistivity.

TABLE 1

|  | Crystallite size, nm | True specific gravity | Resistivity, Ω-cm | $D_{50}$, μm |
|---|---|---|---|---|
| Negative electrode active material #1 | 44 | 2.308 | 2.5M | 10.2 |
| Negative electrode active material #2 | 95 | 2.317 | 56k | 10.2 |
| Negative electrode active material #3 | 98 | 2.318 | 90k | 10.2 |
| Negative electrode active material #4 | 94 | 2.318 | 2.5M | 10.2 |
| Comparative negative electrode active material #1 | 149 | 2.326 | 1M | 9.8 |
| Comparative negative electrode active material #2 | 212 | 2.326 | 2.5M | 10.0 |
| Comparative negative electrode active material #3 | 590 | 2.335 | 1M | 10.5 |
| Comparative negative electrode active material #4 | 700 | 2.334 | 1.2M | 10.5 |
| Comparative negative electrode active material #5 | 690 | 2.335 | 100 | 10.1 |
| Comparative negative electrode active material #6 | 107 | 2.325 | 75k | 10.2 |
| Comparative negative electrode active material #7 | 109 | 2.326 | 85k | 10.2 |
| Comparative negative electrode active material #8 | 93 | 2.329 | 35k | 10.2 |
| Comparative negative electrode active material #9 | 110 | 2.325 | 2.5M | 10.2 |

Determination of Percent Volume Expansion

To confirm the effectiveness of the polycrystalline silicon based negative electrode material, the percent volume expansion of the material was measured. A mixture of negative electrode active material #1 and a dispersion of synthetic graphite (average particle size $D_{50}$=3 μm) and acetylene black as conductive agents in N-methylpyrrolidone (solids 17.5%) was diluted with N-methylpyrrolidone. A polyimide resin (trademark U-Vanish A, solids 18%, by Ube Industries Ltd.) as a binder was added thereto to form a slurry. The slurry was coated onto a copper foil of 12 μm thick by means of a doctor blade having a gap of 50 μm, dried at 200° C. for 2 hours, and pressed by a roller press at 60° C. into a negative electrode shaped form. Finally, pieces of 2 cm² were punched out of the shaped form and used as a negative electrode. The composition of solid components is shown in Table 2.

In each run, four lithium ion secondary cells were fabricated for evaluation using the shaped form as the negative electrode and a lithium foil as the counter electrode, a non-aqueous electrolyte solution of lithium bis(trifluoromethanesulfonyl)imide in a 1/1 (by volume) mixture of ethylene carbonate and diethyl carbonate in a concentration of 1 mol/liter as the nonaqueous electrolyte, and a porous polyethylene film of 30 μm thick as the separator.

The lithium ion secondary cells were aged overnight at room temperature. Two test cells were disassembled whereupon the thickness of the negative electrode was measured, from which an electrode density based on the initial weight in the electrolytic solution swollen state was computed. Note that an increment of lithium resulting from the electrolytic solution and charging was neglected. Next two test cells were tested by means of a secondary cell charge/discharge tester (Nagano K.K.). Charging was conducted with a constant current flow of 0.15 c until the voltage of the test cell reached 0 V, and after reaching 0 V, continued with a reduced current flow so that the cell voltage was kept at 0 V, and terminated when the current flow decreased below 0.02 c. A charge capacity was computed. Note that "c" designates a current value with which the theoretical capacity of a negative electrode is charged in 1 hour, for example, 1 c=3 mA in Run 1. At the end of the charging test, the test cells were disassembled whereupon the thickness of the negative electrode was measured. An electrode density was similarly computed from the thickness, and a charge capacity per volume during charging was computed. The results are tabulated in Table 2. It is seen that electrodes containing at least about 60% of negative electrode active material #1 achieve a charge/discharge capacity of at least 1,500 mAh/cc.

TABLE 2

| | Run | | | | | | | | | |
|---|---|---|---|---|---|---|---|---|---|---|
| | 1 | 2 | 3 | 4 | 5 | 6 | 7 | 8 | 9 | 10 |
| Negative electrode active material #1, wt % | 9 | 18 | 27 | 36 | 45 | 54 | 63 | 72 | 81 | 90 |
| Synthetic graphite, wt % | 81 | 72 | 63 | 54 | 45 | 36 | 27 | 18 | 9 | 0 |
| Acetylene black, wt % | 2.5 | 2.5 | 2.5 | 2.5 | 2.5 | 2.5 | 2.5 | 2.5 | 2.5 | 2.5 |
| Polyimide resin, wt % | 7.5 | 7.5 | 7.5 | 7.5 | 7.5 | 7.5 | 7.5 | 7.5 | 7.5 | 7.5 |
| Electrode density after aging, g/cm$^3$ | 1.42 | 1.44 | 1.40 | 1.47 | 1.50 | 1.42 | 1.40 | 1.40 | 1.41 | 1.40 |
| Electrode density after charging, g/cm$^3$ | 1.05 | 0.93 | 0.85 | 0.75 | 0.70 | 0.70 | 0.66 | 0.66 | 0.67 | 0.66 |
| Charge capacity, mAh/cc | 546 | 735 | 846 | 943 | 1,022 | 1,370 | 1,550 | 1,720 | 1,870 | 2,343 |

Likewise, shaped forms containing 81% by weight of negative electrode active material were prepared using negative electrode active materials #2 to #4 and comparative negative electrode active materials #1 to #9 instead of negative electrode active material #1; and lithium ion secondary cells were fabricated using them. The results are tabulated in Table 3. In Table 3, the results of Run 9 using inventive negative electrode active material #1 are also shown. As compared with the negative electrode material using inventive negative electrode active material #1, negative electrode materials using comparative negative electrode active materials having a crystallite size in excess of 100 nm and a true specific gravity in excess of 2.320 experience a significant volume expansion and thus show no increase of battery capacity per volume.

TABLE 3

| Negative electrode active material | Electrode density after aging, g/cm$^3$ | Volume change factor | Electrode density after charging, g/cm$^3$ | Charge capacity, mAh/cc |
|---|---|---|---|---|
| Negative electrode active material #1 | 1.41 | 2.1 | 0.67 | 1,870 |
| Negative electrode active material #2 | 1.42 | 2.4 | 0.59 | 1,685 |
| Negative electrode active material #3 | 1.42 | 2.5 | 0.55 | 1,730 |
| Negative electrode active material #4 | 1.41 | 2.5 | 0.56 | 1,655 |
| Comparative negative electrode active material #1 | 1.44 | 3.7 | 0.39 | 1,215 |
| Comparative negative electrode active material #2 | 1.42 | 4.1 | 0.35 | 1,200 |
| Comparative negative electrode active material #3 | 1.45 | 4.5 | 0.32 | 1,132 |
| Comparative negative electrode active material #4 | 1.36 | 4.9 | 0.28 | 939 |
| Comparative negative electrode active material #5 | 1.44 | 4.0 | 0.36 | 1,266 |
| Comparative negative electrode active material #6 | 1.43 | 4.2 | 0.34 | 936 |
| Comparative negative electrode active material #7 | 1.43 | 4.7 | 0.30 | 875 |
| Comparative negative electrode active material #8 | 1.44 | 3.7 | 0.39 | 1,080 |
| Comparative negative electrode active material #9 | 1.44 | 4.5 | 0.32 | 880 |

Determination of cycle performance

The negative electrode active material in a lithium ion secondary battery was evaluated by comparing inventive negative electrode active material #1 with comparative negative electrode active materials #1 and #5. Samples were prepared by the following procedure.

To 8.75 parts by weight of the negative electrode active material were added 0.25 part by weight of synthetic graphite (average particle size $D_{50}$=3 μm) and then 1.4 parts by weight of a dispersion of acetylene black in N-methylpyrrolidone (solids 17.5%). The mixture was diluted with 4 parts by weight of N-methylpyrrolidone. Further, 4.2 parts by weight of a polyimide resin (trademark U-Vanish A, solids 18%, by Ube Industries Ltd.) as a binder was added thereto and agitated to form a slurry. The slurry was coated onto a copper foil of 12 μm thick by means of a doctor blade having a gap of 50 μm, dried at 200° C. for 2 hours, and pressed by a roller press at 60° C. into a negative electrode shaped form. Finally, pieces of 2 cm$^2$ were punched out of the shaped form and used as a negative electrode.

To evaluate the cycle performance of the negative electrode shaped form, a coin-type lithium ion secondary cell was fabricated. The positive electrode was a single layer sheet using LiCoO$_2$ as the active material and an aluminum foil as the current collector (trade name Pioxcel C-100 by Pionics Co., Ltd.). The nonaqueous electrolyte was a nonaqueous electrolyte solution of lithium hexafluorophosphate in a 1/1 (by volume) mixture of ethylene carbonate and diethyl carbonate in a concentration of 1 mol/liter. The separator was a porous polyethylene film of 30 μm thick.

The cell was aged two nights at room temperature before it was tested by means of a secondary cell charge/discharge tester (Nagano K.K.). Charging was conducted with a constant current flow of 1.2 mA (0.25 c vs. positive electrode) until the voltage of the test cell reached 4.2 V, and after reaching 4.2 V, continued with a reduced current flow so that the cell voltage was kept at 4.2 V, and terminated when the current flow decreased below 0.3 mA. Discharging was conducted with a constant current flow of 0.6 mA and terminated when the cell voltage reached 2.5 V. A discharge capacity was determined. The charge/discharge operation was repeated 200 cycles. The results are plotted in FIG. 4. It is seen that the lithium ion secondary cell using negative electrode active material #1 featuring minimal volume expansion displays good cycle performance as compared with Comparative Examples of polycrystalline silicon and metallic silicon.

The invention claimed is:

1. A negative electrode material for nonaqueous electrolyte secondary batteries, characterized in that the negative electrode material comprises polycrystalline silicon particles as an active material, crystallites of the polycrystalline silicon have a grain diameter of 20 nm to 100 nm in terms of a crystallite size determined by the Scherrer method from the full width at half maximum of a diffraction peak attributable to Si(111) around 2θ=28.4° in x-ray diffraction pattern analysis, and the silicon particles have a true specific gravity of 2.300 to 2.320.

2. A negative electrode material for nonaqueous electrolyte secondary batteries according to claim 1, further comprising a binder.

3. A negative electrode material for nonaqueous electrolyte secondary batteries according to claim 2, wherein the binder is a polyimide resin.

4. A negative electrode material for nonaqueous electrolyte secondary batteries according to claim 2, comprising the polycrystalline silicon particles in a proportion of 60 to 97% by weight, the binder in a proportion of 3 to 20% by weight, and a conductive agent in a proportion of 0 to 37% by weight.

5. A negative electrode material for nonaqueous electrolyte secondary batteries according to claim 4, wherein the conductive agent is present in a proportion of 1 to 37% by weight and incorporated as a dispersion of the conductive agent which has undergone dispersion treatment.

6. A negative electrode material for nonaqueous electrolyte secondary batteries according to claim 1, wherein the polycrystalline silicon particles contain 0.1 to 100 ppm of at least one dopant selected from boron, phosphorus and arsenic.

7. A negative electrode for nonaqueous electrolyte secondary batteries, characterized in that the negative electrode comprises a negative electrode material for nonaqueous electrolyte secondary batteries according to claim 1 wherein the thickness change of the negative electrode is not more than 3 times before and after charging.

8. A nonaqueous electrolyte secondary battery comprising a negative electrode form comprising a negative electrode for nonaqueous electrolyte secondary batteries according to claim 7, a positive electrode form, a separator between the positive electrode and the negative electrode, and a nonaqueous electrolyte.

9. A nonaqueous electrolyte secondary battery according to claim 8 which is a lithium ion secondary battery.

10. A negative electrode material for nonaqueous electrolyte secondary batteries according to claim 1, wherein the crystallites of the polycrystalline silicon have a grain diameter of 20 nm to 80 nm.

* * * * *